Patented Sept. 3, 1935

2,013,084

UNITED STATES PATENT OFFICE 2,013,084

ORGANIC COLORING MATERIALS COMPRISING AZO COMPOUNDS AND SULPHONATED DERIVATIVES OF PYROGENIC DECOMPOSITION PRODUCTS OF ROSIN

Edward R. Allen, Summit, Wayne N. Headley, Livingston, and Alfred Siegel, Hillside, N. J., assignors to Krebs Pigment & Color Corporation, Newark, N. J., a corporation of Delaware No Drawing. Application October 16, 1933, Serial No. 693,820

17 Claims. (Cl. 134—58.5)

The present invention relates to azo pigments and to lakes containing as a substratum sulphonated derivatives of pyrogenic decomposition products of rosin and to processes of making the same by developing the pigment in the presence of said derivatives.

Azo pigments are usually produced by converting more or less water soluble azo dyestuffs into their water insoluble alkaline earth metal or other insoluble salts and eventually combining them with an inorganic substratum, such as alumina hydrate or other water insoluble mineral compounds, as is well known in this art. Likewise, these substrata may be added to insoluble azo dyestuffs which do not contain salt forming groups.

Two of us have shown in U. S. Re. 18,590 that under certain circumstances insoluble metallic rosinates can act as an organic substratum for azo pigments and that the so obtained lakes and pigments have outstanding advantages over lakes and pigments containing the usual mineral substrata.

We have found that the replacement of all or part of the mineral or rosin substrata, used previously, by certain rosin derivatives produces novel pigments and lakes of certain particular and valuable properties.

Such rosin derivatives contain the carbon nucleus of abietic acid but they differ therefrom by a different saturation stage in respect to hydrogen, such as may be the case in oxidized or hydrogenated rosin or rosins submitted to catalytic or pyrogenic reactions, or some of the hydrogen is replaced by negative groups such as halogen, a nitro group or sulpho groups, or the carboxylic group of the abietic acid may have been split up during the reactions to which the abietic acid has been submitted; as a general proposition the rosin derivatives useful in our invention can be considered chemically to contain the carbon skeleton of abietic acid but contain different amounts of hydrogen than abietic acid and in addition they contain a negative group.

The present application relates particularly to sulphonated compounds of rosin derivatives obtained by catalytic and pyrogenic decomposition of rosin.

Our new preferred substrata are characterized by containing the sulphonic acid group and being derived from natural rosin by pyrogenic and catalytic reactions and their condensation products. Such products are, for instance, abietene sulphonic acids made according to U. S. Patent 1,853,352 by sulphonating abietene, which is obtainable either by the pyrogenic decomposition of rosin or abietic acid or by the catalytic decomposition of abietic acid containing material; abietane sulphonic acids, obtained by sulphonating hydrogenated abietene, as in U. S. Patent 1,853,348; abietine sulphonic acids as produced in accordance with U. S. Patent 1,853,353 from the pyrogenic decomposition of abietic acid in the presence of iron and sulphonic acids from other catalytic decomposition reactions of rosin. The property of being useful as pigment substrata is generally present in all the sulphonation products derived from such pyrogenic reaction products of rosin or abietic acid. Moreover, the condensation products of abietene sulphonic acids with formaldehyde and other aldehydes may also be used as such substrata.

When used in the formation of azo lakes and pigments these sulphonation products impart to the finished products an increased brightness, a cleaner tone and other valuable pigmenting properties.

The present invention is applicable to various azo dyestuffs of the following three types which are capable of being transformed into pigments:

*Mono-azo monosulphonic acids.*—The sulphonic acid group is usually and preferably located in the first, or diazo component. These toners are more or less soluble in the form of their free acids or alkali metal salts and are rendered insoluble by treatment with an alkaline earth or heavy metal salt. Instances of such combinations are the compounds formed by coupling 1. Diazotized 2 - naphthylamine 1 - sulphonic acid with beta naphthol (lithol red, Colour Index No. 189).

2. Diazotized para-nitraniline ortho-sulphonic acid with beta naphthol (lake red P, Colour Index No. 158).

3. Diazotized 2-naphthylamine 1-sulphonic acid with salicylic acid.

4. Diazotized para-toluidine - meta - sulphonic acid with the anilide of beta-oxynaphthoic acid.

*Mono-azo monocarboxylic acids.*—The carboxylic acid group may be in either component and the component not containing the carboxylic group may or may not contain a sulphonic acid group. These toners are more or less soluble as their free acids or alkali metal salts and are rendered insoluble by treatment with an alkaline earth or heavy metal salt. For example, such toners can be formed by coupling 1. Diazotized para-toluidine meta-sulphonic acid with beta-oxynaphthoic acid (lithol rubine, Colour Index No. 163).

2. Diazotized-para-nitro ortho-toluidine with beta-oxynaphthoic acid.

3. Diazotized anthranilic acid with beta naphthol (lake red D, Colour Index No. 214).

4. Diazotized 2-naphthylamine 1-sulphonic acid with beta-oxynaphthoic acid (lake Bordeaux B, Colour Index No. 190).

*Azo pigment dyestuffs.*—This type of toner is a substantially insoluble dyestuff produced in the coupling itself and does not contain salt-forming groups. The following illustrative cases are formed by coupling.

1. Diazotized para-nitro-aniline with beta naphthol (para red, Colour Index No. 44).

2. Diazotized meta-nitro para-toluidine with aceto-acetanilide (Hansa yellow G).

3. Diazotized para-nitro ortho-toluidine with beta naphthol (pigment orange R, Colour Index No. 68).

4. Diazotized alpha-naphthylamine with beta naphthol (authol red RL, Colour Index No. 82).

For convenience sake and to follow common industrial and commercial practice we use the term beta-oxynaphthoic acid herein to designate the 2.hydroxynaphthalene-3.carboxylic acid.

For the purpose of this invention and in accordance with commercial practice, a "toner" is defined as an organic pigment which may or may not contain salt-forming groups and which is not associated with a substratum or extender; and a "lake" is an organic pigment which contains a substratum or extender. In the former type of pigment the true coloring matter is produced directly in an insoluble form and can be used for various purposes as such, without the addition of a substratum; in the latter type the true coloring matter is associated intimately with a substratum, which is commonly an inorganic substance, such as alumina hydrate, blanc fixe, etc. or combinations of the same.

The choice between the two types of pigments depends largely upon the intended use, there being various essential differences in their properties, which relate to texture, dispersion, oil absorption, bulking value, and behavior in vehicles. These differences are best explained by the following illustrations.

The alkaline earth salt of the dyestuff prepared by coupling diazotized para-toluidine meta-sulphonic acid with beta-oxynaphthoic acid may be used as such (toner form) or may be extended with a substratum consisting of alumina hydrate and blanc fixe (lake form). For use as a rubber pigment it has been found that the lake form has definite advantages over the toner in respect to (a) greater strength for the same dyestuff content, (b) reduction of the tendency to crock, and (c) blending with other pigments. Similarly, in the application of pigments to linoleum the lake or extended type of pigment has a definite advantage because of ease of dispersion. In paints and enamels, toners are generally used for their advantages in such properties as gloss; however, in the case of the cheap para reds (so-called grinder's reds) a substratum is an aid in the grinding of the paint. In the field of printing inks, the lake form of pigment may offer an advantage over the toner form under certain conditions where texture is an important problem. On the other hand, toners show advantages from the point of view of allowing the ink-maker greater freedom in the choice of white base (extender) which he grinds into the ink; however, under certain conditions the combination of toner and white pigment ordinarily used in the ink might be replaced by a lake color which would result in simplification in the manufacture of the ink.

The present invention relates to the lakes which contain a substratum, and they can be obtained from the toner type of azo compounds as well as from the azo compounds which only by association with a substratum become a pigment, or lake; in both instances the azo compound is substantially water insoluble before developing or becomes so during development.

The products of the present invention combine to a certain extent the color strength and properties of a toner with the properties usually found in a lake formed with an inorganic substratum.

The essential step in the process of our invention is the development of the lake or pigment in the presence of a water insoluble, sulphonated derivative of the pyrogenic decomposition products of rosin. By the term development we refer to that step in the manufacture of lakes or pigments which consists essentially in heating or boiling an aqueous suspension of the insoluble azo compound. During this step some physical and/or chemical changes take place in the azo compound which combines with the substratum whereby the full tinctorial value of the pigment is produced.

The sulphonation products which we found useful in our invention act as dispersing agents, when added in small amounts to a dye suspension. This is not their main function in the preparation of our novel products, as a matter of fact it is in many instances preferred to add at the development stage a relatively small amount of a dispersing agent, of which sulphonated vegetable or animal oils, such as Turkey red oil, sulphonated castor oil, sulphonated cotton seed oil, sulphonated fish oil, etc. are representative commercially available examples. The development is carried out in neutral or preferably alkaline condition as shown in the appended examples.

Our novel substrata are commonly water soluble when in the form of their alkali metal salts. Another essential feature of our invention consists in having these substrata in substantially water insoluble form when present during the development step.

The alkaline earth and heavy metal salts of the novel substrata are well adapted for the formation of our novel lakes and pigments, particularly the calcium and barium, aluminum, zinc, lead salts, etc. which do not substantially affect the shades of the azo compounds.

The addition of our novel substrata and their transformation into insoluble salts can take place at any desired step of the process which, except as to the development in the presence of these substrata, follows usual practice in the preparation of lakes and azo pigments.

We can, for instance, add the sodium salts of the sulphonated derivatives of the pyrogenic reaction products of the rosins to either the diazo compound or the coupling compound and after formation of the azo coloring compound precipitate the azo compound and the substratum with an alkaline earth metal or heavy metal salt and then develop the like. We can also add the soluble substratum to the azo compound, then precipitate and develop, or we can prepare separately the alkaline earth metal or heavy metal salt of the substratum and add them at any step of the preparation of the insoluble azo compound and finish the lake or pigment by development, or we can prepare the suspension of the insoluble azo compound and insoluble substratum in any desired manner as will be evident to those skilled in the art.

The amounts of our novel, sulphonated derivatives useful in our invention are substantial and range from a few per cent by weight of the finished lake or pigment to 50% or even more. In all instances a noticeable improvement in the tinctorial and dispersible properties of the products will be evident.

The following are examples of the preparation of our novel lakes and pigments. It will be understood that the manipulations in these preparations can be varied to a large extent, for example, in certain cases a preliminary boiling of the sulphonation products may enhance the tinctorial properties of the resulting lake; it will also be understood that the process is applicable to other azo coloring compounds and that other sulphonated derivatives of pyrogenic reactions of rosins can be used and that similar results will be obtained.

*Example I.*—A solution of 41.8 parts of the sodium salt of paratoluidine metasulphonic acid (CH₃:SO₃:NH₂=1:3:4)

is diazotized with 14.4 parts of nitrite of soda and 52 parts of 20° Bé. muriatic acid.

40 parts of beta-oxynaphthoic acid (OH:COOH=2:3)

are dissolved in a solution of 16.3 parts of caustic soda and 200 parts of water. To this are added 40.3 parts of soda ash in 400 parts of water. The temperature and volume of the beta-oxynaphthoic acid solution is adjusted to 40° C. and 1000 parts of solution, and the above described diazo preparation is then run in whereupon the azo coupling proceeds quickly and to good completion. After stirring a short time the dyestuff is filtered.

The soda salt dye paste is then reslurried to 16,800 parts of water at 40° C. To this are added 9.6 parts of para soap in 50 parts of water. In a separate container 32 parts of abietene sodium sulphonate are added to a solution of 22.75 parts of caustic soda in 1000 parts of water, and the solution boiled. This solution is then added to the dye solution and the temperature adjusted to 40° C. and stirred 15 minutes.

In a separate container 80 parts of calcium chloride are dissolved in 2000 parts of water and the temperature adjusted to 27° C., and into this is then run in 10 minutes the dye plus abietene sulphonate solution. There is then added 41 parts of caustic soda in 500 parts of water and the slurry stirred for 15 minutes. The charge is then developed by heating to the boil and digested at this temperature for ½ hour, after which it is washed, filtered, and dried in the usual manner. The yield is approximately 112 parts of pigment compared with 92 parts in a charge carried out in exactly the same way but without the abietene sulphonate. The pigment contains about 18% of abietene calcium sulphonate, as the substratum and is equal in covering power (determined by tinting in white) to the product obtained without the use of abietene sulphonate, and is equal in this respect to the ordinary commercial calcium lithol rubine toner. When ground into litho varnish, the resulting ink produces a print which gives a bright, golden bronze tone.

*Example II.*—A solution of 41.8 parts of the sodium salt of paratoluidine metasulphonic acid (CH₃:SO₃:NH₂=1:3:4)

is diazotized with 14.4 parts of nitrite of soda and 52 parts of 20° Bé. muriatic acid.

40 parts of beta-oxynaphthoic acid (OH:COOH=2:3)

are dissolved in a solution of 16.3 parts of caustic soda and 200 parts of water. To this are added 40.3 parts of soda ash in 400 parts of water. The temperature and volume of the beta-oxynaphthoic acid solution is adjusted to 40° C. and 1000 parts of solution, and the above described diazo preparation is then run in whereupon the azo coupling proceeds and to good completion. After stirring a short time the dyestuff is filtered.

The soda salt dye paste is then reslurried to 16,800 parts of water at 40° C. To this are added 9.6 parts of para soap in 50 parts of water. In a separate container 32 parts of condensation product of abietene sulphonate and formaldehyde are added to a solution of 6.5 parts of caustic soda in 400 parts of water, and the solution boiled. The resulting solution is then added to the dye solution and the temperature adjusted to 40° C. and stirred 15 minutes.

In a separate container 80 parts of calcium chloride are dissolved in 2000 parts of water and the temperature adjusted to 27° C., and into this is then run in 10 minutes the above mixed solution. There is then added 41 parts of caustic soda in 500 parts of water and the slurry stirred for 15 minutes. The charge is then developed by heating to the boil and digested at this temperature for ½ hour, after which it is washed, filtered, and dried in the usual manner.

The yield is approximately 107 parts of pigment compared with 92 parts in a charge carried out in exactly the same way but without the condensation product of abietene sulphonate and formaldehyde. The finished pigment contains about 14% of the calcium salt of the abietene sulphonate-formaldehyde condensation product, as the substratum and is equal in strength to the normal product and is superior to it in richness of shade and clarity of tone.

*Example III.*—A solution of 41.8 parts of the sodium salt of paratoluidine metasulphonic acid (CH₃:SO₃:NH₂=1:3:4)

is diazotized with 14.4 parts of nitrite of soda and 52 parts of 20° Bé. muriatic acid.

40 parts of beta-oxynaphthoic acid (OH:COOH= 2:3)

are dissolved in a solution of 16.3 parts of caustic soda and 200 parts of water. To this are added 40.3 parts of soda ash in 400 parts of water. The temperature and volume of the beta-oxynaphthoic acid solution is adjusted to 40° C. and 1000 parts of solution, and the above described diazo preparation is then run in whereupon the azo coupling proceeds quickly and to good completion. After stirring a short time the dyestuff is filtered.

The soda salt dye paste is then reslurried to 16,800 parts of water at 40° C. To this are added 9.6 parts of para soap in 50 parts of water. In a separate container 32 parts of (beta) abietene sodium sulphonate are added to a solution of 6.5 parts of caustic soda in 400 parts of water, and the solution boiled. The resulting solution is then added to the dye solution and the temperature adjusted to 40° C. and stirred 15 minutes.

In a separate container 80 parts of calcium chloride are dissolved in 2000 parts of water and the temperature adjusted to 27° C. and into this is then run in 10 minutes the dye-abietene sulphonate solution. There is then added 41 parts of caustic soda in 500 parts of water and the slurry stirred for 15 minutes. The charge is then heated to the boil and digested at this temperature for ½ hour, after which it is washed, filtered, and dried in the usual manner. The yield is approximately 107 parts of pigment compared with 92 parts in a charge carried out in exactly the same way but without the abietene sodium sulphonate (beta). The difference is the novel substratum contained in the lake, which comprises about 14% of the lake, the resulting strength is equal to the normal product and is superior in richness of shade and clarity of tone.

*Example IV.*—69 parts of para nitro aniline are dissolved in 60 parts of muriatic acid (100%) and 300 parts of water at 80-90° C. and the solution is then allowed to flow in a fine stream onto 625 parts of ice and water with good stirring. The resulting suspension is then diazotized in the usual manner with 37.5 parts of sodium nitrite, after stirring approximately 20 minutes, the diazo preparation is partially neutralized with 25 parts of whiting and the stirring continued for 15 minutes.

To a solution of 17.5 parts of calcium chloride (75%) in 225 parts of water at 20° C. is added a solution of 37.5 parts of sulphonated abietene in 500 parts of water and the resulting mixture stirred fifteen minutes. Previously, to a solution of 26 parts of caustic soda and 26 parts of soda ash (98%) in 400 parts of water is added 71.5 parts of betanaphthol and the mixture heated until a clear solution is obtained. To this solution is also added a mixture of 6.5 parts of para soap in 65 parts of water, and the resulting solution is added in a fine stream to the abietene calcium sulphonate. The temperature and volume of the resulting mixture is adjusted to 15° C. and 2900 parts of solution; and the above diazo solution is run in whereupon the azo coupling proceeds quickly and smoothly to completion. After stirring a short time the dyestuff is brought rapidly to the boil and boiled five minutes, the product is then flooded, washed, and dried in the usual manner. The yield is approximately 173 parts of pigment compared with 160 parts in a charge carried out in exactly the same way but without the sulphonated abietene. The pigment contains about 7% of abietene calcium sulphonate. This lake pigment possesses good tinctorial properties, also low bronze and blueness of shade, with good strength and texture.

*Example V.*—A solution of para-nitro ortho-toluidine is prepared by dissolving 77.5 parts of para-nitro ortho-toluidine in a mixture of 55 parts of muriatic acid (100%) and 750 parts of water at 60° C. This solution is then poured into ice and adjusted to 0° C., the resulting solution or suspension is diazotized in the usual manner with 37.5 parts of sodium nitrite.

145 parts of the anilide of beta-oxynaphthoic acid (OH:CO—NH—C₆H₅=2:3) are dissolved in a solution of 43 parts of caustic soda and 500 parts of water. To this are added 70 parts of sodium acetate, and after stirring to solution; 15 parts of para soap in 125 parts of water; and then 37.5 parts of sulphonated abietene in 500 parts of water. The resulting solution is adjusted to 5000 parts of solution at 4° C., and the above diazo preparation run in rapidly. This is followed by a solution of 30.5 parts of caustic soda in 375 parts of water, and the entire mixture is brought to 40° C. in twenty minutes, at which temperature the azo coupling proceeds rapidly to completion. After stirring a few minutes the dyestuff is made to 40,000 parts of solution at 27° C. and acidified with 12.5 parts of glacial acetic acid. After this there is added in 10 minutes a solution of 75 parts of calcium chloride in 500 parts of water. There is then added 20.5 parts of caustic soda in 250 parts of water, and the slurry stirred for 15 minutes. The charge is then developed by heating to the boil and digested at this temperature for ½ hour, after which it is washed, filtered, and dried in the usual manner.

The yield is approximately 238 parts of pigment compared with 218 parts in a charge carried out in exactly the same way but without the abietene sulphonate. The pigment contains about 8% of abietene calcium sulphonate. This lake pigment possesses besides the characteristics tinctorial properties, a bright yellow printing tone, and excellent strength.

*Example VI.*—A mixture of 68.5 parts of anthranilic acid and 1125 parts of water are stirred to a thin paste, and 22.5 parts of muriatic acid (100%) are added. The resulting solution is iced to 3° C., and diazotized in the usual manner with 37 parts of sodium nitrite.

75 parts of beta naphthol are dissolved in a solution of 233 parts of caustic soda and 400 parts of water. In a separate container 37.5 parts of sulphonated abietene are added to a solution of 75 parts of caustic soda in 750 parts of water, and the solution boiled for ½ hour. The resulting solution is then added to the beta-naphthol solution, and the solution is adjusted to 3000 parts of solution at 18° C. The diazo preparation is run in beneath the surface in ½ hour, and stirred until the azo coupling is completed. The dyestuff is then allowed to stand overnight, and the following day it is made to 10,000 parts of solution at 25° C. This slurry is struck in 10 minutes into a solution of 150 parts of barium chloride in 5000 parts of water at 25° C. After 15 minutes stirring, it is adjusted to 25,000 parts of solution and slowly brought to 140° C., and maintained at this temperature for ½ hour, after which it is washed, filtered and dried in the usual manner.

The yield is approximately 192 parts of pigment compared with 169 parts in a charge carried out in exactly the same way but without the abietene sulphonate. The pigment contains about 12% of abietene barium sulphonate. The lake pigment possesses a bright, clean yellow printing tone and excellent strength.

*Example VII.*—A mixture of 68.5 parts of anthranilic acid and 1125 parts of water are stirred to a thin paste, and 22.5 parts of muriatic acid (100%) are added. The resulting solution is iced to 3° C. and diazotized in the usual manner with 37 parts of sodium nitrite.

99 parts of beta oxynaphthoic acid (OH:COOH=2:3) are dissolved in a solution of 46 parts of caustic soda and 500 parts of water. The temperature and volume of the beta oxynaphthoic acid solution is adjusted to 15° C. and 3000 parts of solution, and the above described diazo preparation is then run in whereupon the azo coupling proceeds to completion. The dye slurry is made to 13,000 parts of solution at 40° C., and to this is added a solution prepared by adding 75 parts of sulphonated abietene to a solution of 14 parts of caustic soda in 1500 parts of water and boiling for ½ hour. After stirring a short time the dye slurry is precipitated by running it into a boiling solution of 200 parts of calcium chloride and 5000 parts of water; then boiled 20 minutes to insure development, and then washed, filtered, and dried in the usual manner.

The yield is approximately 265 parts of dry product compared to 180 parts in a charge prepared without the sulphonated abietene. The lake pigment contains about 32% of sulphonated calcium abietene, and possesses the desirable characteristic of a clean, yellow printing tone.

We claim:

1. In a process of preparing azo lakes and pigments the step which comprises developing an aqueous suspension of an insoluble azo coloring compound in the presence of a sulphonated derivative of a pyrogenic decomposition product of rosin.

2. In a process of preparing azo lakes and pigments the step which comprises developing by heating an aqueous suspension of an insoluble azo coloring compound in the presence of an insoluble salt of a sulphonated derivative of a pyrogenic decomposition product of rosin.

3. In a process of preparing azo lakes and pigments the step which comprises developing by heating an aqueous suspension of an alkaline earth metal salt of an azo coloring compound in the presence of an alkaline earth metal salt of a sulphonated derivative of a pyrogenic decomposition product of rosin.

4. In a process of preparing azo lakes and pigments the step of developing by heating an aqueous suspension of an insoluble azo coloring compound in the presence of an insoluble salt of one of the compounds of the group consisting of abietene sulphonic acid, abietane sulphonic acid, abietine sulphonic acid and the sulphonic acids obtained by condensing an abietene sulphonic acid with an aldehyde.

5. A new lake or pigment comprising an insoluble azo coloring compound combined with a substratum comprising a sulphonated derivative of a pyrogenic decomposition product of rosin.

6. A new lake or pigment comprising an insoluble azo coloring compound combined with a substratum comprising an insoluble salt of one of the compounds of the group consisting of abietene sulphonic acid, abietane sulphonic acid, abietine sulphonic acid and the sulphonic acids obtained by condensing an abietene sulphonic acid with an aldehyde.

7. A new lake or pigment comprising an insoluble azo coloring compound combined with a substratum comprising an insoluble salt of a sulphonated abietene.

8. A new lake or pigment comprising an insoluble salt of a mono azo coloring compound containing only one sulpho group combined with a substratum comprising a sulphonated derivative of a pyrogenic decomposition product of rosin.

9. A new lake or pigment comprising an insoluble salt of a mono azo coloring compound containing only one sulpho group combined with a substratum comprising an insoluble salt of a sulphonated abietene.

10. A new lake or pigment comprising an insoluble salt of the azo dye obtained by coupling a diazotized toluidine sulphonic acid with beta oxynaphthoic acid combined with a substratum comprising a sulphonated derivative of a pyrogenic decomposition product of rosin.

11. A new lake or pigment comprising the calcium salt of the azo dye obtained by coupling diazotized paratoluidine meta-sulphonic acid with beta-oxynaphthoic acid combined with a substratum comprising the calcium salt of an abietene sulphonic acid.

12. A new lake or pigment comprising an insoluble salt of the azo dye obtained by coupling diazotized anthranilic acid with beta naphthol combined with a substratum comprising an insoluble salt of abietene sulphonic acid.

13. A new lake or pigment comprising the azo coloring compound obtained by coupling diazotized para-nitraniline with beta naphthol combined with a substratum comprising an insoluble salt of abietene sulphonic acid.

14. In a process of preparing azo lakes and pigments the step which comprises developing by heating an aqueous suspension of an insoluble azo coloring compound in the presence of a substratum comprising an insoluble salt of a rosin derivative containing the carbon skeleton of abietic acid but containing a different amount of hydrogen than abietic acid and containing a negative group.

15. A new lake or pigment comprising an insoluble azo coloring compound combined with a substratum comprising an insoluble salt of a rosin derivative containing the carbon skeleton of abietic acid but containing a different amount of hydrogen than abietic acid and containing a negative group.

16. In a process of preparing azo lakes and pigments the step of developing by heating an aqueous suspension of an insoluble azo coloring compound in the presence of an insoluble salt of a condensation product of an abietene sulphonic acid with an aldehyde.

17. A new lake or pigment comprising an insoluble azo coloring compound combined with a substratum comprising an insoluble salt of a condensation product of an abietene sulphonic acid with an aldehyde.

EDWARD R. ALLEN.
WAYNE N. HEADLEY.
ALFRED SIEGEL.